May 6, 1941.  R. L. HARTMAN ET AL  2,240,647
SANITARY BOTTLE LIP
Filed April 22, 1939  2 Sheets-Sheet 1
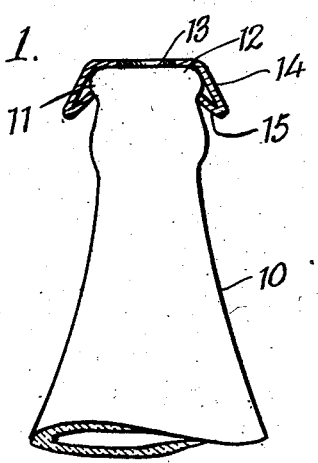
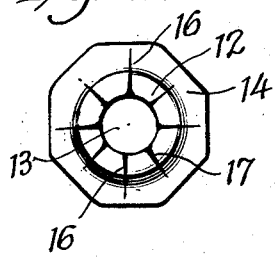
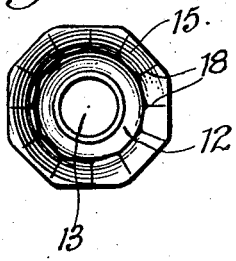
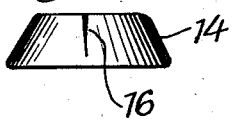
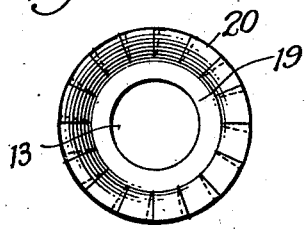
Inventor
Royal Lauren Hartman,
Harry Sanford Lowe,
By John H Farley
Attorney May 6, 1941.  R. L. HARTMAN ET AL  2,240,647
SANITARY BOTTLE LIP
Filed April 22, 1939   2 Sheets-Sheet 2
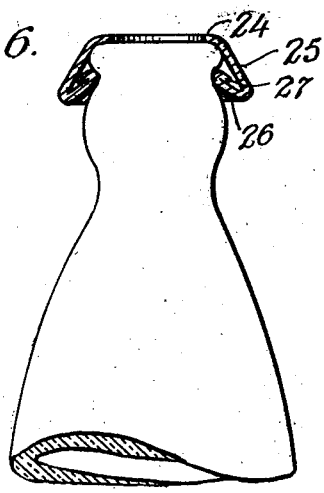
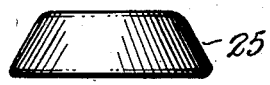
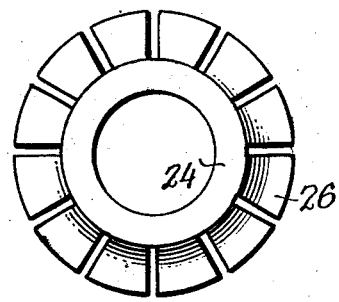
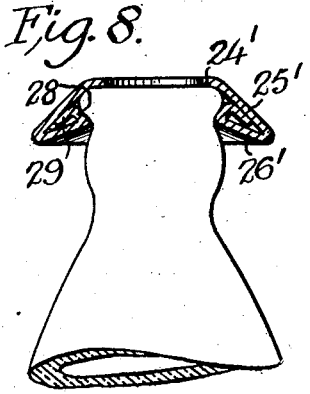
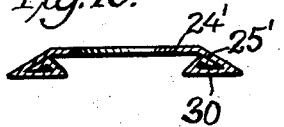
Inventors,
Royal Lauren Hartman,
Harry Sanford Lowe,
By John W Farley
Attorney Patented May 6, 1941

2,240,647

UNITED STATES PATENT OFFICE 2,240,647

SANITARY BOTTLE LIP

Royal Lauren Hartman and Harry Sanford Lowe, Memphis, Tenn.

Application April 22, 1939, Serial No. 269,510

5 Claims. (Cl. 215—100)

Our said invention relates to an attachment for bottles, jugs and the like and it is an object of the same to provide a sanitary device particularly intended for use with receptacles that are provided with an outer head at or close to the upper end of the container, by means of which a user who drinks the contents directly from the container will be protected against having his lips touch the container directly.

This device is particularly intended for use in connection with the drinking of liquids from bottles where the liquid is not sucked out as through a nipple, but flows out by gravity, as so called "soft drinks" are very commonly consumed. This method of drinking from the bottle is more sanitary than the use of a tumbler, which also contains germs, if a way can be devised to reduce the chance of taking in germs from the unsterilized surfaces about the mouth of the bottle. Bottled drinks are commonly placed in cooling devices containing water and, because of relatively infrequent change of that water, it becomes contaminated and contains dirt and germs of many varieties. In the case of bottles having the ordinary metal caps such contaminated water creeps under the skirt of the cap until stopped by the cork layer that rests on top of the bottle wall, and such contaminated water remains on the surface of the bottle when the cap is removed, so that there is always considerable chance that germs of various sorts will be imbibed with the contents of the bottle, and furthermore the water adhering to the bottle flows downward toward the mouth of the same when the bottle is inverted in drinking and is liable to be swallowed with the contents of the bottle. It is an object of our invention to protect the mouth of the bottle effectively so that the lips of the user shall not contact with it and so that there shall be little or no chance for him to imbibe germs or contaminated water in drinking from the bottle.

Another object of the invention is to reduce the number of bottles that must be thrown away because they become chipped at the mouth when opened with a metal bottle opener. The chipped edges thus left on the mouth of the bottle are very objectionable to users, but not so when covered by such means as the device of our invention.

Another object of the invention is to provide a device of this character which shall fit conveniently against the lips of the user and tend to prevent the user from projecting the bottle unduly far into his mouth.

Another object of the invention is to provide a lip with means for receiving any water that flows toward the mouth of the inverted bottle and for conducting it away from the bottle mouth.

Another object of the invention is to provide a lip of this character such that a series of lips can be held in an automatic dispenser and that the lowermost lip will readily attach itself to a bottle mouth and will engage the same strongly enough for withdrawal from the dispenser by mere withdrawal of the bottle, without any necessity for engaging the lip with the hands of the user or to provide any complicated releasing means for releasing the lowermost lip from the dispenser.

Referring to the drawings, which are made a part of this application and in which similar reference characters indicate similar parts:

Fig. 1 is an elevation of a part of a bottle, showing a sectional view of one of our lips applied thereto;

Fig. 2, a top plan of a lip;

Fig. 3, a bottom plan,

Fig. 4, a side elevation;

Fig. 5, a plan view of a modified form;

Fig. 6, a view like Fig. 1, showing another lip;

Fig. 7, a side view of said lip,

Fig. 8, a view like Fig. 1, showing still another form of lip,

Fig. 9, a plan of a blank from which the lip of Fig. 8 was made, and

Fig. 10, a detail of a further modification.

In the drawings reference character 10 indicates the neck of a bottle which is provided at or near its upper end with an external bead 11.

In the preferred form of our invention herein shown the lip is made of paper or paper-like material, preferably of the character used in making artificial straws for drinking purposes. It will be obvious however that various other materials such as Celluloid, Cellophane, etc., may be used and we do not limit ourselves to this preferred material. The lip comprises an upper flange 12 adapted to rest flat on the rim or verge of the bottle mouth and having a central opening at 13, which opening is equal in size to that of the bottle mouth or a little larger, so as not to interfere with the outflow of the liquid from the bottle. An outwardly flaring resilient skirt 14 provides a convenient abutment for the lips of the user and conveniently positions the bottle against the lips so as to insure against accidental entry of the bottle into the mouth to such an extent that the lips of the user will contact with the neck of the bottle beyond the lower margin of the lip. At the lower end of the skirt there is a flange 15 which is turned inward and upward at such an angle that its inner margin may engage against the side of the bottle neck and preferably against the underside of the bead 11, so as to resist quite strongly any force tending to remove the lip from the bottle; i. e., as strongly as is consistent with the nature of the material of which the lip is made.

When the lip is made of thin resilient paper or paperlike material the material of its body or skirt will ordinarily be crimped or folded, as on the lines indicated at 16, and a smaller number of fold lines will appear in the top flange 12, as indicated at 17, than in the bottom flange 15, as indicated at 18 in Fig. 3. The inturned or reversed bottom flange 15 is particularly important, both because of its positive engagement against the bead and because of the resilience of the skirt 14 and the flange 15 which permits considerable expansion in positioning the lip and yet makes the lip act resiliently and quickly to grip the bottle neck effectively, and also because of the action of both of these inclined portions 14 and 15 in preventing water from flowing down the inverted bottle and so into the mouth of the user.

Fig. 5 is a modified form of the invention having an opening 13 (such opening in all forms of the invention being as large as the opening in the top of the bottle, or preferably somewhat larger). This lip is pressed out of paper or the like in such a way as to form a flange 19 which has no folds or crimps or slots but is simply a flat ring adapted to rest on the top of a bottle. The depending skirt 20 in this construction has folds which are formed in the compressing or stamping operation, such folds extending axially or lengthwise of the lip and is turned inwardly at its lower end to form a flange of similar appearance in section to the flange 15 of Fig. 1.

Figs. 6, 7 and 9 show another modification of the invention wherein a blank (Fig. 9) having an integral flange 24 surrounding a central opening corresponding in size approximately to the opening in the bottle is provided with a skirt 25 which may be stamped or pressed and may or may not show crimps or fold lines, etc. At the lower end of the skirt there is a series of inturned separate prongs 26 each of which may be first bent inward as shown in Fig. 6 and then have its extreme end doubled over as at 27 to form a reenforced end bearing against the bottle neck in the circular depression below the annular bead.

In another form of the invention, substantially similar to the form shown in Figs. 6, 7 and 9, the flange 24', the skirt 25' and the inturned part 26' of the prong may be as above described, but the end of each prong is bent so as to form an arrangement triangular in section, as shown in Fig. 8, this figure showing a part 28 forming one side of the triangle and bearing against the underside of the bead and showing another side 29 resting against the skirt. If desired, the folding process may be continued to reenforce this triangular formation, as further shown in Fig. 10 at 30.

It is within the contemplation of our invention to mold or stamp the upper part of the lip so as to form a uniform flat portion resting on the rim of the bottle while retaining the crimped resilient lower portion, or to mold the entire cap, with provision for a resilient flange (whether crimped or not) so constructed that it can readily yield outwardly and then snap back to maintain the lip in place. Many other variations in the form and material of our device will also occur to those skilled in the art all without departing from the spirit of our invention, and therefore we do not limit ourselves to what is shown in the drawings and described in the specification but only as is required by the state of the prior art.

We claim:

1. A sanitary bottle lip comprising a flat upper flange surrounding an opening approximately coextensive with the mouth of a bottle on which the lip is to be used, a skirt having a flared portion standing outward from the neck of a bottle to which the lip is applied, and a resilient portion adapted to expand and pass over a bead on the bottle neck and then to contract and grip the underside of said bead.

2. A sanitary bottle lip having a flat annular flange with a central opening and an outwardly flared skirt the material of which is divided into prongs folded under to provide a reenforced portion substantially triangular in section lengthwise of said lip, one face of said triangular portion being arranged so as to engage an under face of a bead on a bottle to which the lip is applied.

3. A sanitary attachment for use with a bottle or the like having a bead about its mouth, comprising a lip having an opening substantially coextensive with the bottle mouth, a portion about said opening resting on the rim of the bottle, and a flaring resilient skirt with an inturned bottom flange adapted to bear with its margin against the underside of said bead.

4. A sanitary attachment for use with a bottle or the like having a bead about its mouth, comprising a guard or lip of thin sheet material having an opening approximately coextensive with the said mouth, a flange about said opening adapted to rest on the rim of the bottle, a flaring skirt extending outward and downward from said flange to provide an abutment for engagement by the lips of the user to limit movement of the bottle into the user's mouth, and a resilient reversed flange extending inward and upward from the bottom of the skirt, said flange being so formed as to be adapted to grip the periphery of the bottle and arrest the flow of water on the outside of the bottle toward the mouth of the user when the bottle is tilted up.

5. A nestable sanitary guard or lip for bottles and the like, having a bead about the mouth thereof, comprising a flat annular flange with a central opening therein, an outwardly flared depending skirt portion merging at its upper end with said flange, and a resilient flange extending inwardly and upwardly from the lower end of the skirt, the space between said resilient flange and said flat flange being approximately equal to the thickness of a bottle bead, the relative size of the openings in the two flanges being such that when the bead of a bottle is inserted through said resilient flange in the lowermost of a stack of nested guards the end of the bottle will bear against the upper flange and the resilient flange will grip the bottle neck below said bead.

ROYAL LAUREN HARTMAN.
HARRY SANFORD LOWE.